United States Patent
Hanna

(10) Patent No.: US 8,519,032 B2
(45) Date of Patent: Aug. 27, 2013

(54) CRUSHED STONE SURFACE TEXTURE COMPOSITION AND PROCESS FOR APPLYING THE SAME

(76) Inventor: Malek Z. Hanna, Woodland Hills, CA (US)

(*) Notice: Subject to any disclaimer, the term of this patent is extended or adjusted under 35 U.S.C. 154(b) by 323 days.

(21) Appl. No.: 13/049,039

(22) Filed: Mar. 16, 2011

(65) Prior Publication Data

US 2011/0236574 A1  Sep. 29, 2011

Related U.S. Application Data

(60) Provisional application No. 61/318,486, filed on Mar. 29, 2010.

(51) Int. Cl.
*C08G 18/38* (2006.01)

(52) U.S. Cl.
USPC .......... 524/35; 427/209; 427/372.2; 524/563; 524/437

(58) Field of Classification Search
USPC .......................................................... 524/35
See application file for complete search history.

(56) References Cited

U.S. PATENT DOCUMENTS

| 928,061 | A | 7/1909 | Mitats |
| 2,901,368 | A | 8/1959 | Newell et al. |
| 2,950,206 | A | 8/1960 | Ostergren |
| 3,826,663 | A | 7/1974 | Minicozzi et al. |
| 3,853,570 | A | 12/1974 | Nonis et al. |
| 4,111,868 | A | 9/1978 | Ficken |
| 4,219,362 | A | 8/1980 | Colegrove |
| 4,514,471 | A | 4/1985 | Sugimoto et al. |
| 5,541,620 | A | 7/1996 | Reynolds |
| 5,574,081 | A * | 11/1996 | Kroon ............................. 524/56 |
| 5,660,620 | A | 8/1997 | Flores-Garza |
| 6,358,309 | B1 * | 3/2002 | Langford ....................... 106/661 |
| 6,547,873 | B1 | 4/2003 | Ramirez de Arellano |
| 7,449,060 | B2 | 11/2008 | Langford |
| 2005/0103234 | A1 | 5/2005 | McNulty, Jr. |
| 2007/0272127 | A1 | 11/2007 | Puccio |
| 2008/0028987 | A1 | 2/2008 | Duda |
| 2008/0160301 | A1 | 7/2008 | Nandi et al. |
| 2008/0187742 | A1 | 8/2008 | Toncelli |
| 2008/0216715 | A1 | 9/2008 | Langford |

FOREIGN PATENT DOCUMENTS

| FR | 2 792 934 A1 | 11/2000 |
| JP | 55164257 A | 12/1980 |
| JP | 57027177 A | 2/1982 |

* cited by examiner

*Primary Examiner* — Doris Lee
(74) *Attorney, Agent, or Firm* — Kelly & Kelley, LLP

(57) ABSTRACT

A crushed stone surface texture composition includes by weight approximately 45-65% crushed stones, 5-25% stone dust and 15-35% resin. The resin includes by weight approximately 40-60% industrial grade adhesive and also 40-60% industrial grade thickening agent, water and ammonia. The crushed stones may vary in size from 0.0625 inch diameter to 0.09375 inch diameter. The crushed stones and the stone dust may include marble or granite. The industrial grade adhesive includes a vinyl acetate copolymer emulsion stabilized with anionic surfactants. The industrial grade thickening agent comprises hydroxyethyl cellulose. Exemplary embodiments may also include 0.1-15% fire proofing material which may include alumina trihydrate. Stone dust fills the voids and pores resulting in a smoother finished product that retains it aesthetic look and color over time while remaining easy to clean.

24 Claims, 4 Drawing Sheets

CRUSHED STONE SURFACE TEXTURE COMPOSITION AND PROCESS FOR APPLYING THE SAME

FIELD OF THE INVENTION

The present invention generally relates to wall and surface compositions. More particularly, the present invention relates to using a crushed stone surface texture composition and process for applying the same.

BACKGROUND OF THE INVENTION

During construction of homes, buildings, and other various structures, there is a need for a variety of interior and exterior wall coverings. Wall coverings serve to protect the interior of the dwelling from the outside environment while also being aesthetically pleasing. Wall coverings have been devised from many materials and compositions over the centuries of human development. One such popular wall covering material is made from granite, granulite, marble or the like. These wall coverings have been popular in Europe, where large, heavy slabs and blocks are formed and constructed to create a wall whose exceptional beauty and elegance would endure for thousands of years. While these materials are durable and aesthetically pleasing, there are severe drawbacks to their widespread use. They are costly to manufacture and are extremely heavy, thereby adding a substantial amount of weight to a buildings construction. Additionally, when fabricating stone wall coverings from granite and marble, a significant amount of waste is produced. Waste is also produced from other industries creating decorative statues, monuments, headstones and the like. The waste is typically smaller chunks of stone which are no longer desired. These smaller chunks and bits can be ground into a mix of stones for later use in other applications. Also, when cutting a sheet of stone such as marble, dust is created. This marble dust can then be collected and reused.

Venice is a particular area where weight conservation was and remains to be very important. Venice is built upon the sea and is slowly sinking. Accordingly, it is desired to keep the weight of any structure to a minimum. Heavy stones and the like are only used for structural support to create the foundation of the buildings. Having a building burdened with large and heavy marble stones as wall coverings would unduly weigh the structure down. Because it was impossible to use stone slabs for the walls of any structure, other unique methods of wall coverings were experimented with. For many years architects and designers experimented with various methods and materials, looking for a way to finish walls to give their city the same enduring elegance as cities built on the mainland. To this end they were able to come up with Lime Wash, Venetian Plaster and Granulite.

Venetian Plaster is a finishing technique using thin layers of plaster applied with a spatula or trowel and then burnished to create a smooth surface with the illusion of depth and texture. "Venetian Plaster" is an American-made term to explain the variety of different techniques and materials used to create the polished stucco finish. The term "Venetian Plaster" is a common misconception. The English word "plaster" comes from old French word "plaister" which literally means gypsum. The term "Venetian Plaster" is mainly used between architects and designers in the US. None of the materials used to create those finishes is actually a plaster, except the Scagliola finish. Basic plaster mix is comprised of gypsum, sand and lime or sometimes just the gypsum and sand. In other words, gypsum is the main material in the plaster mix. Stucco is the mix of lime and sand (traditional) and modern stucco is the mix of lime, cement and sand. Another form of wall covering is Granulite. Granulite originally was used as a decorative application for the exterior only, but can now be used as an interior wall covering. However, the finished surface is very rough and full of noticeable pores in between the rocks which will collect dust. Unfortunately the dust cannot be removed through various cleaning techniques. This will eventually negatively affect the overall look of the wall covering.

Marble dust has been used for making cement compounds, such as those used for swimming pools. The first step in building a built-in swimming pool is excavation of the pool site. A steel reinforced cage is installed and bent to form a grid-like pattern to strengthen the cement shell. A pump trunk then shoots a grout mix/shotcrete (also called gunite) out of a nozzle onto the cage and pool walls. Marble dust is then applied to the gunite. The life of the marble dust finish is dependent upon a number of factors including proper chemical balances, such as the amount of calcium. Additionally, tiles may be affixed upon the marble dust. While this process works well for swimming pools, but does not lend itself for use as lightweight wall coverings.

Accordingly, there exists a need for a new form of wall/surface covering that can be easy to apply, light, inexpensive and not be full of noticeable pores and the like which can become dirty. Additionally, there is a need for a mixture to be non-cementitious and water-based. Also, it is advantageous if this new form of surface covering was fire resistant. The present invention fulfills these needs and provides other related advantages.

SUMMARY

The crushed stone surface texture composition of the present invention includes by weight approximately 45-65% crushed stones, 5-25% stone dust and 15-35% resin. The resin includes by weight approximately 40-60% industrial grade adhesive and also 40-60% industrial grade thickening agent, water and ammonia.

The crushed stones vary in size from 0.0625 inch diameter to 0.09375 inch diameter. The crushed stones may include marble or granite. Furthermore, the stone dust may include marble or granite dust.

The industrial grade adhesive includes a vinyl acetate copolymer emulsion stabilized with anionic surfactants. The industrial grade thickening agent comprises hydroxyethyl cellulose. Exemplary embodiments may also include 0.1-15% fire proofing material. The fire proofing material may include alumina trihydrate.

The process for applying a surface texture composition includes the steps of mixing a composition including by weight approximately 45-65% crushed stones, 5-25% stone dust, and 15-35% resin. The resin includes by weight approximately 40-60% industrial grade adhesive and also 40-60% industrial grade thickening agent, water and ammonia.

The next step is to apply a 0.0625-0.25 inch thick layer of the composition to a substrate. Then the composition is cured over time. Finally, a sealer may be applied over an outer surface of the composition.

The substrate may be translucent or transparent. Also, it is possible to apply a second 0.0625-0.25 inch thick layer to an opposite side of the translucent or transparent substrate. The second layer may be selectively applied to form a design, logo or insignia. This then allows lights to pass through from side to the other during night and display a logo or insignia not normally seen during the daylight.

The crushed stones may vary in size from 0.0625 inch diameter to 0.09375 inch diameter. The crushed stones may include marble or granite. The stone dust may include marble or granite dust.

The industrial grade adhesive may include a vinyl acetate copolymer emulsion stabilized with anionic surfactants. The industrial grade thickening agent may include hydroxyethyl cellulose. Exemplary embodiments may also include 0.1-15% fire proofing material. The fire proofing material may include alumina trihydrate.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 2:
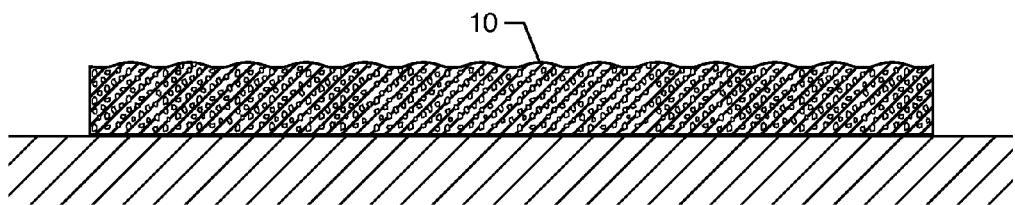
FIG. 2 is a sectional view of an exemplary wall composition embodying the present invention.

As shown in the drawings for purposes of illustration, the present invention for a wall/surface composition is referred to generally by the reference number 10. An exemplary embodiment of the wall composition 10 as shown in FIG. 2 is an adhesive-based (non-cementitious) and water-based composition comprising crushed stones, stone dust, an industrial grade adhesive, an industrial grade thickening agent, and ammonia. The crushed stones are made from crushed marble, granite, or the like and should be about the $1/16^{th}$ of an inch in diameter (0.0625 inches) to about $3/32^{nd}$ of an inch in diameter (0.09375 inches). The stone dust is made from the dust of marble, granite or the like that is created from various fabrication processes dealing with stone. The stone dust fills the voids and pores of the wall composition 10 resulting in a smoother finished product. About 70% of the pores will be eliminated due to the addition of the stone dust.

An industrial grade adhesive binds all the component parts together. The industrial grade adhesive for construction products can be a vinyl acetate copolymer emulsion stabilized with anionic surfactants. One such example of a vinyl acetate copolymer emulsion is Vinavil 03V.

To help slow the reaction of the adhesive and to thicken it, a thickening agent is used. The industrial grade thickening agent can be hydroxyethyl cellulose (HEC). Hydroxyethyl cellulose is used in a range of applications from cosmetics, cleaning solutions, household products, chewing gum and to the construction industry. Hydroxyethyl cellulose is a non-ionic, water-soluble polymer that can thicken, suspend, bind, emulsify, form films, stabilize, disperse, retain water, and provide protective colloid action. It is readily soluble in hot or cold water and can be used to prepare solutions with a wide range of viscosities. It has outstanding tolerance for dissolved electrolytes. For construction, hydroxyethyl cellulose is used in gypsum, cement, lime and organic plasters, tile adhesives, and mortars. In cement formulations, it is used as a retarder and moisture retaining agent. Hydroxyethyl cellulose improves the workability of gypsum plaster by increasing the open and trowelling times. In the present application, hydroxyethyl cellulose is mixed with the industrial grade adhesive to help thicken it while also slowing the chemical reaction down such that it allows sufficient time for a construction worker to mix and then apply it to a surface, whether using a trowel or a spray gun.

Ammonia is also added to the composition. Ammonia (NH3), as used commercially, is often called anhydrous ammonia. This term emphasizes the absence of water in the material. Because NH3 boils at $-33.34°$ C., the liquid must be stored under high pressure or at low temperature. Its heat of vaporization is, however, sufficiently high so that NH3 can be readily handled in ordinary beakers, in a fume hood (i.e., if it is already a liquid it will not boil readily). "Household ammonia" or "ammonium hydroxide" is a solution of NH3 in water. The strength of such solutions is measured in units of baume (density), with 26 degrees baume (about 30 weight percent ammonia at $15.5°$ C.) being the typical high concentration commercial product. Household ammonia ranges in concentration from 5 to 10 weight percent ammonia. As used in the present application, ammonia eliminates the possibility of growing fungus. When the wall composition 10 is used for exterior walls, moisture in the air or from rain then combined with dirt and other environmental particulates can lead to the growth of fungus and other undesirable bacteria. Ammonia naturally kills such unwanted growths to help keep the surface clean and aesthetically pleasing.

In another exemplary embodiment, a sealer can be applied over the composition after it has had time to set. Sealing the surface will protect it from dust and water absorption while making the surface even smoother.

In another exemplary embodiment, the composition can include a fire proofing powder. The fire proofing powder can be alumina trihydrate. Examples of such alumina trihydrates are Huber SB-36 and SB-336. SB-36 and SB-336 are a course, mechanically ground alumina trihydrate used to suppress flame and smoke in applications such as latex, vinyl and urethane compounds. Adding a fire proofing powder allows the composition to be applied to structural supports and beams.

Figure 1:
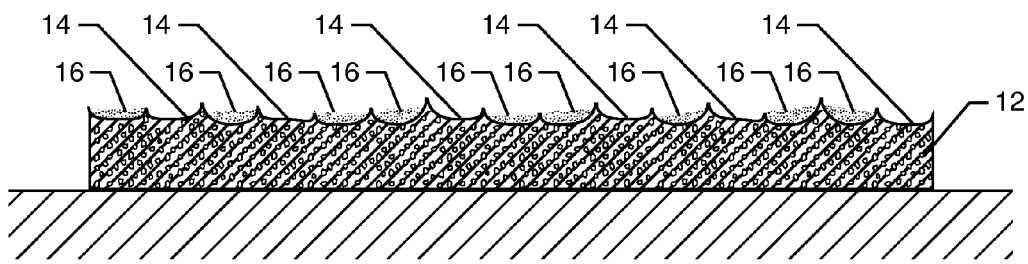
FIG. 1 is a sectional view of a prior art wall composition.

FIG. 1 shows the prior art of a typical wall covering 12 in a sectional view. The wall covering 12 has a relatively bumpy and coarse surface full of divots and pits 14. The divots and pits 14 are traps for dirt 16. Unfortunately, the pits 14 trap the dirt 16 so well that it is hard to clean. Overtime, the dirt 16 accumulates to such a level that the wall covering 12 looks dirty and is less aesthetically pleasing.

As shown in FIG. 2, the exemplary embodiment of the present invention results in a smoother surface. A smoother surface of the wall covering 10 has less divots and pits 14 to trap dirt 16 to begin with. Additionally, it is easier to clean if it does get dirty. It is the stone dust from the marble and granite that allows 70% of the surface pores to be filled over the prior art. In areas where a stone wall is initially desired, using the wall composition 10 instead is not only cheaper but also significantly lighter. Additionally, because the composition is made from natural stone, it has a natural color that will not fade with time and weather.

The wall composition 10 results in a wall covering that is both beautiful and durable. It is long lasting, water proof, lightweight, and fade resistant. Furthermore, there is an advantage that the composition has by being based on adhesives. The adhesive based wall composition 10 has internal flexibility and therefore will bridge hair cracks that may be created by an underlying surface, such as stucco. This means that the wall composition 10 will wear better over time due to structural shifts from either earthquakes or tremors, and also from the natural shifting a wall will go through due to temperature changes and other environmental factors.

Figure 3:
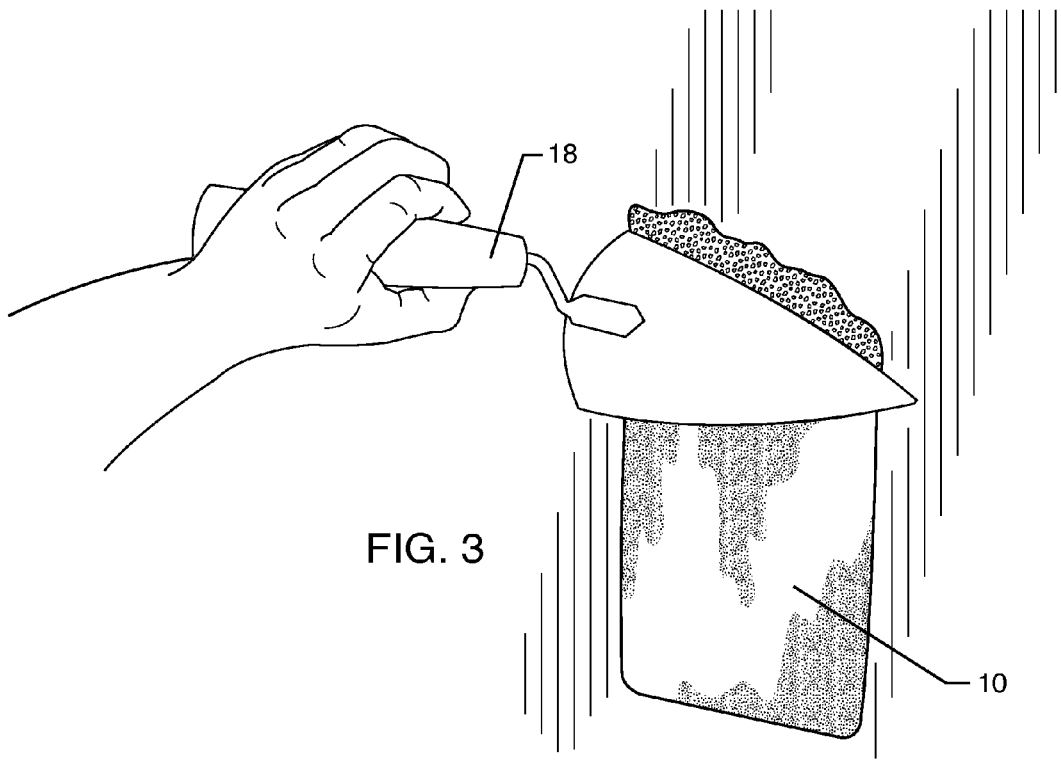
FIG. 3 is a perspective view of the application of the exemplary wall composition of FIG. 2 with a trowel.
Figure 4:
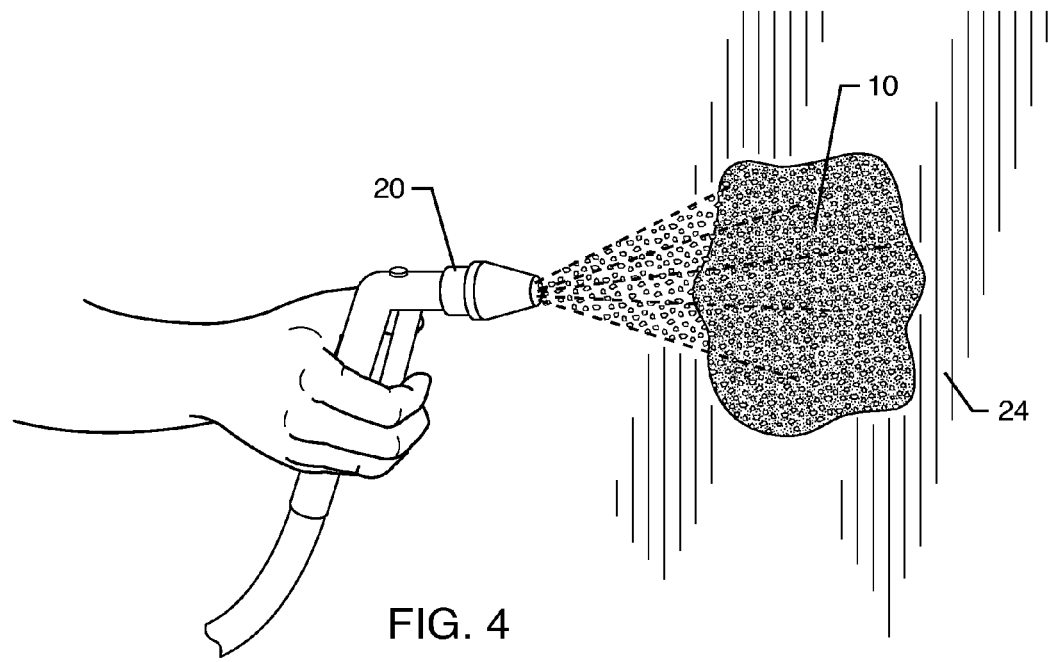
FIG. 4 is a perspective view of the application of the exemplary wall composition of FIG. 2 with a spray gun.

FIGS. 3 and 4 show how the wall composition can be applied to a substrate 24. It is best that the substrate 24 where the wall composition 10 will be applied to is not glossy but rather have a matte or flat finish, as this may affect the bond. A rough, textured, or porous surface is best for application and can be properly prepared through sanding and the like. The wall composition 10 can be applied to wood, drywall, metal, stucco and other various surfaces. FIG. 3 shows the wall composition 10 being applied with a trowel 18. Typically, the resulting wall composition 10 may be $1/16^{th}$ to $1/8^{th}$ inch thick when applied with the trowel 18. FIG. 4 shows that a spray gun 20 can be used to apply the wall composition 10 into areas that are hard to reach, or difficult for a trowel to properly apply. The resulting wall composition 10 applied by a spray gun 20 may be up to ¼ inch thick, depending on how many coats were sprayed.

Figure 5:
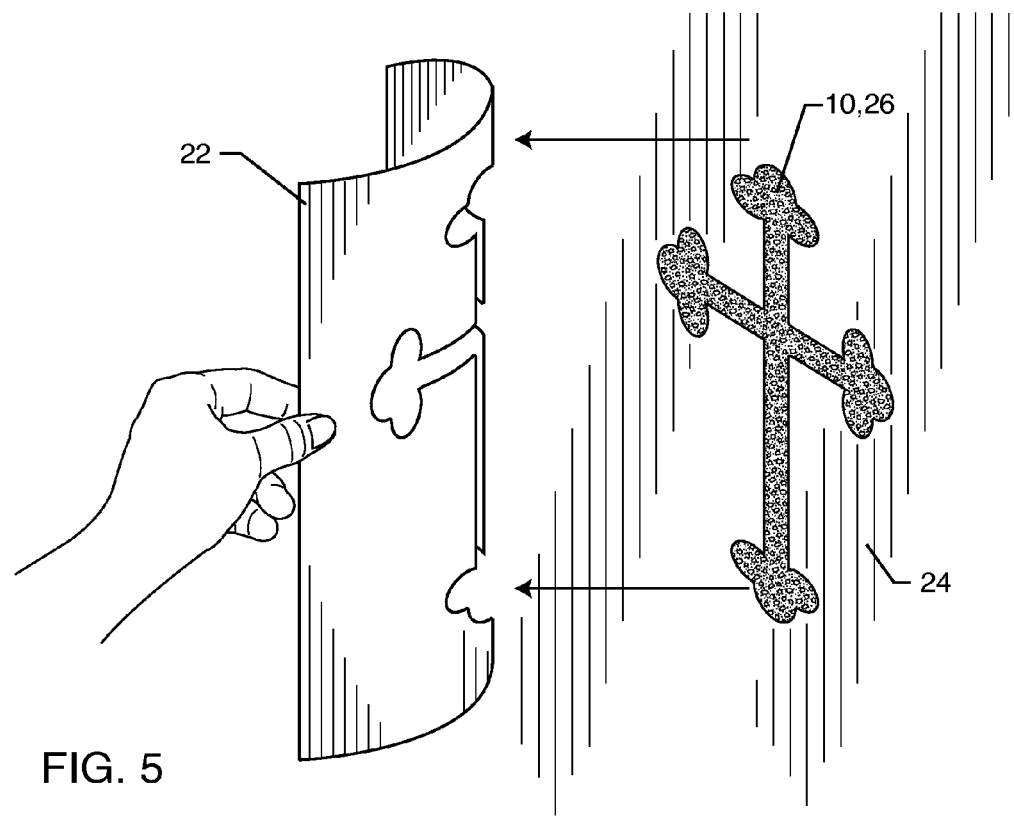
FIG. 5 is a perspective view of the application of the exemplary wall composition of FIG. 2 using a stencil.

The wall composition 10 can also be used in decorative applications. By changing the composition of the color of the stone dust and crushed stones, a varying range of colors and appearances are possible for various graphics, logos, drawings, insignias and signs 26. Furthermore, as shown in FIG. 5, a stencil 22 or even removable tape can be used to create unique designs on a surface. The stencil 22 can be used with the trowel 18 as shown in FIG. 3 or with the spray gun 20 as shown in FIG. 4.

Figure 6:
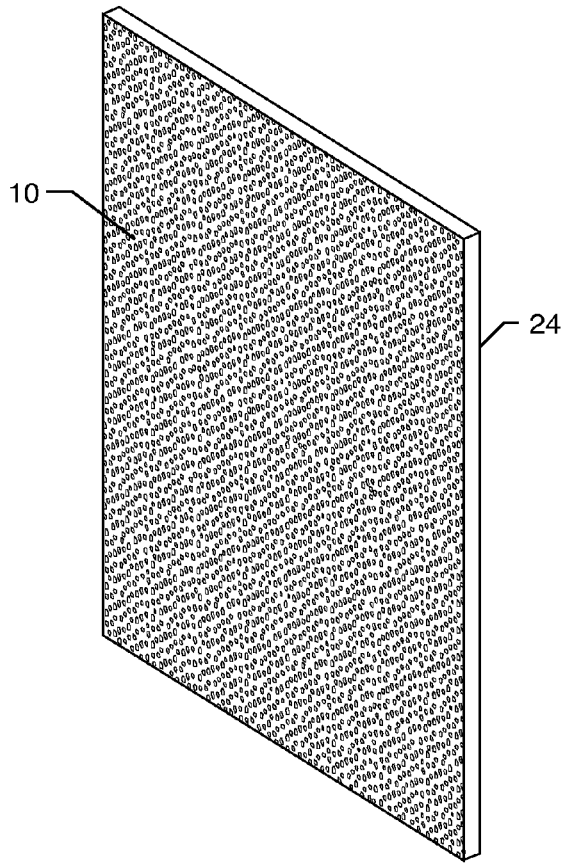
FIG. 6 is a perspective view of an exemplary wall composition applied to a substrate.
Figure 7:
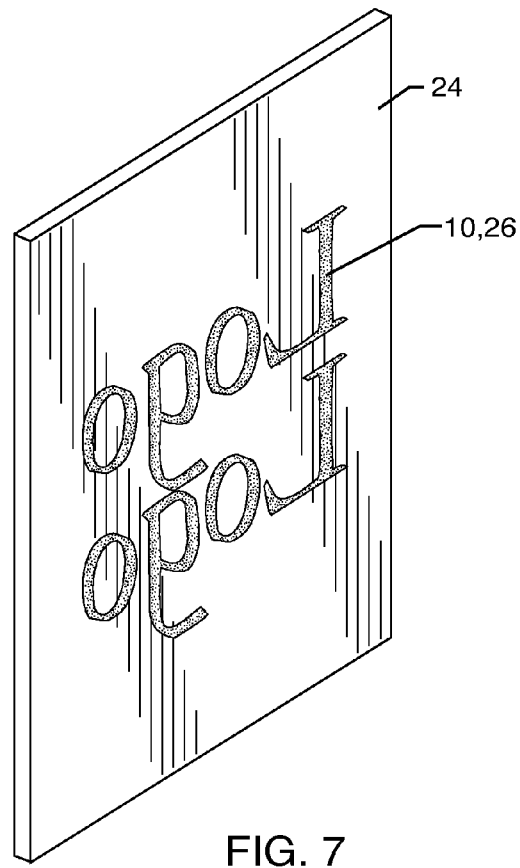
FIG. 7 is a perspective view of an opposite side of the substrate in FIG. 6 now with a second substrate selectively formed into a logo.

FIG. 6 is a perspective view of an exemplary wall composition 10 applied to a substrate 24. The substrate 24 may be transparent or translucent. This means that light can pass through the substrate 10 and be seen from the other side with backlighting. For instance the substrate 24 may be a window or a section of Plexiglas, acrylic or similar clear or translucent plastic or glass composition. FIG. 7 is a perspective view of an opposite side of the substrate 24 in FIG. 6. The opposite side of the substrate 24 now has the composition 10 formed as a logo 26. In daylight, one cannot see the composition on the opposite side of the substrate 24, but can only see the composition on the same side of the substrate 24 as shown in FIGS. 6 and 7.

Figures 8, 9:
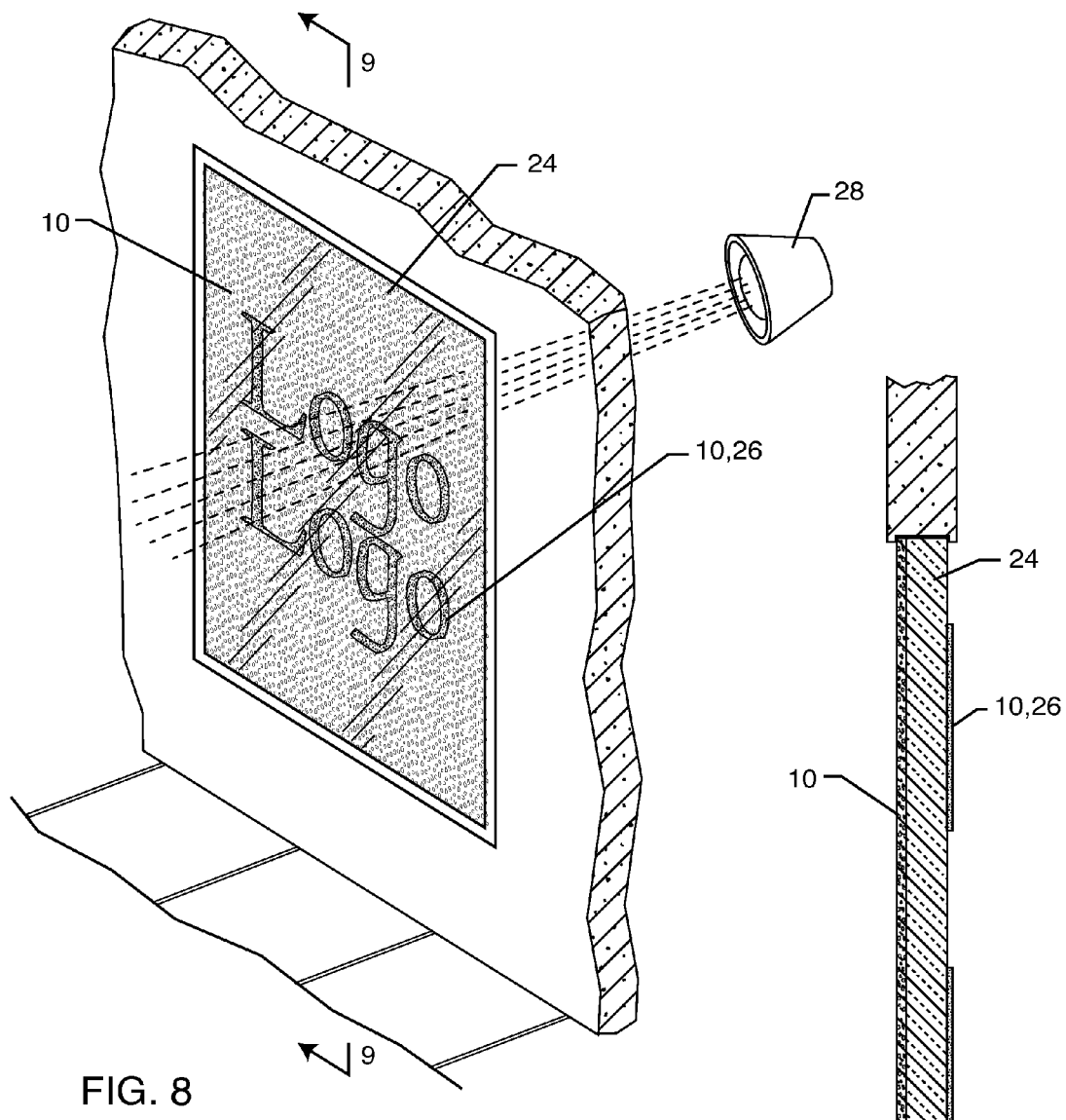
FIG. 8 is a perspective view of a window with a substrate applied to an outer and inner surface.
FIG. 9 is a sectional view taken along line 9-9 of FIG. 8.

FIG. 8 is a perspective view of a window substrate 24 with a composition 10 applied to the outer surface and a logo 26 applied to the inner surface. A backlight 28 illuminates the composition 10 and the logo 26 when viewed from outside the window substrate 24 as shown in FIG. 8. FIG. 9 is a sectional view taken along line 9-9 of FIG. 8. FIG. 9 shows how the window substrate 24 has the composition 10 on one side with the composition 10 formed as a logo 26 on the other side.

In an exemplary embodiment the wall composition 10 is comprised of, by weight, 55% crushed stones, 15% stone dust, 5% fire proofing material and 25% of resin comprised of the industrial grade adhesive and thickening agent. By weight, the resin itself may be made up of about 50% of the industrial grade adhesive, and then the other 50% is comprised of thickening agent, ammonia and water. The percentage ranges of each component part of the wall composition 10 can vary by about ±10% to achieve different material properties both structurally and aesthetically. For instance, in an exemplary embodiment the crushed stones may be between 45-65%, the stone dust may be between 5-25%, the fire proofing material may be between 0-15%, and the resin can be between 15-35% by weight. In another exemplary embodiment for a decorative coating, the wall composition 10 is comprised of, by weight, 50% crushed stone, 20% stone dust, and 30% resin. In yet another exemplary embodiment for a decorative coating, the wall composition 10 is comprised of, by weight, 65% crushed stones and 35% resin. As one can see varying amounts of component parts may be used without deviating from this application's teaching, and accordingly it is not to be limited to the precise forms described herein.

Although several embodiments have been described in detail for purposes of illustration, various modifications may be made to each without departing from the scope and spirit of the invention. Accordingly, the invention is not to be limited, except as by the appended claims.

What is claimed is:

1. A crushed stone surface texture composition, comprising by weight approximately:
    45-65% crushed stones;
    5-25% stone dust; and
    15-35% resin, the resin comprising by weight approximately 40-60% industrial grade adhesive, and 40-60% industrial grade thickening agent, water and ammonia.

2. The composition of claim 1, wherein the crushed stones vary in size from 0.0625 inch diameter to 0.09375 inch diameter.

3. The composition of claim 2, wherein the crushed stones comprise marble or granite.

4. The composition of claim 1 or 3, wherein the stone dust comprises marble or granite dust.

5. The composition of claim 1, wherein the industrial grade adhesive comprises a vinyl acetate copolymer emulsion stabilized with anionic surfactants.

6. The composition of claim 1 or 5, wherein the industrial grade thickening agent comprises hydroxyethyl cellulose.

7. The composition of claim 3 or 5, including 0.1-15% fire proofing material.

8. The composition of claim 7, wherein the fire proofing material comprises alumina trihydrate.

9. A crushed stone surface composition, comprising by weight approximately:
    45-65% crushed stones varying from 0.0625 inch diameter to about 0.09375 inch diameter;
    5-25% stone dust, including marble or granite dust;
    15-35% resin, the resin having by weight approximately 40-60% industrial grade adhesive including a vinyl acetate copolymer emulsion stabilized with anionic surfactants, and 40-60% industrial grade thickening agent, water and ammonia, where the industrial grade thickening agent includes hydroxyethyl cellulose; and
    0.1-15% fire proofing material including alumina trihydrate.

10. The composition of claim 9, wherein the crushed stones comprise marble or granite.

11. A process for applying a surface texture composition, comprising the steps of:
    mixing a composition comprising by weight approximately 45-65% crushed stones, 5-25% stone dust, and 15-35% resin, the resin comprising by weight approximately 40-60% industrial grade adhesive, and 40-60% industrial grade thickening agent, water and ammonia;
    applying a 0.0625-0.25 inch thick layer of the composition to a substrate;

curing the composition over time; and applying a sealer over an outer surface of the composition.

12. The process of claim 11, wherein the substrate is translucent or transparent.

13. The composition of claim 12, including the step of applying a second 0.0625-0.25 inch thick layer to an opposite side of the substrate.

14. The composition of claim 13, wherein the second layer is selectively applied to form a design, logo or insignia.

15. The process of claim 11, wherein the crushed stones vary in size from 0.0625 inch diameter to 0.09375 inch diameter.

16. The process of claim 15, wherein the crushed stones comprise marble or granite.

17. The composition of claim 11 or 16, wherein the stone dust comprises marble or granite dust.

18. The composition of claim 11, wherein the industrial grade adhesive comprises a vinyl acetate copolymer emulsion stabilized with anionic surfactants.

19. The composition of claim 11 or 18, wherein the industrial grade thickening agent comprises hydroxyethyl cellulose.

20. The composition of claim 16 or 18, including 0.1-15% fire proofing material.

21. The composition of claim 20, wherein the fire proofing material comprises alumina trihydrate.

22. A process for applying a surface texture composition, comprising the steps of:

mixing a composition comprising by weight approximately 45-65% crushed stones including marble or granite varying in size from 0.0625 inch diameter to 0.09375 inch diameter, 5-25% stone dust including marble or granite, and 15-35% resin, the resin comprising by weight approximately 40-60% industrial grade adhesive including a vinyl acetate copolymer emulsion stabilized with anionic surfactants, and 40-60% industrial grade thickening agent including hydroxyethyl cellulose, water and ammonia, and 0.1-15% fire proofing material including alumina trihydrate;

applying a 0.0625-0.25 inch thick layer of the composition to a substrate;

curing the composition over time; and applying a sealer over an outer surface of the composition.

23. The process of claim 22, wherein the substrate is translucent or transparent.

24. The composition of claim 23, including the step of applying a second 0.0625-0.25 inch thick layer to an opposite side of the substrate.

* * * * *

UNITED STATES PATENT AND TRADEMARK OFFICE
CERTIFICATE OF CORRECTION

| | | |
|---|---|---|
| PATENT NO. | : 8,519,032 B2 | Page 1 of 1 |
| APPLICATION NO. | : 13/049039 | |
| DATED | : August 27, 2013 | |
| INVENTOR(S) | : Malek Z. Hanna | |

It is certified that error appears in the above-identified patent and that said Letters Patent is hereby corrected as shown below:

In the Claims

In column 7, line 5 (claim 13), delete "composition" and insert -- process --.

In column 7, line 8 (claim 14), delete "composition" and insert -- process --.

In column 7, line 15 (claim 17), delete "composition" and insert -- process --.

In column 7, line 17 (claim 18), delete "composition" and insert -- process --.

In column 7, line 20 (claim 19), delete "composition" and insert -- process --.

In column 7, line 23 (claim 20), delete "composition" and insert -- process --.

In column 8, line 1 (claim 21), delete "composition" and insert -- process --.

In column 8, line 22 (claim 24), delete "composition" and insert -- process --.

Signed and Sealed this
Fifth Day of November, 2013

Teresa Stanek Rea
*Deputy Director of the United States Patent and Trademark Office*